Patented Sept. 10, 1929.

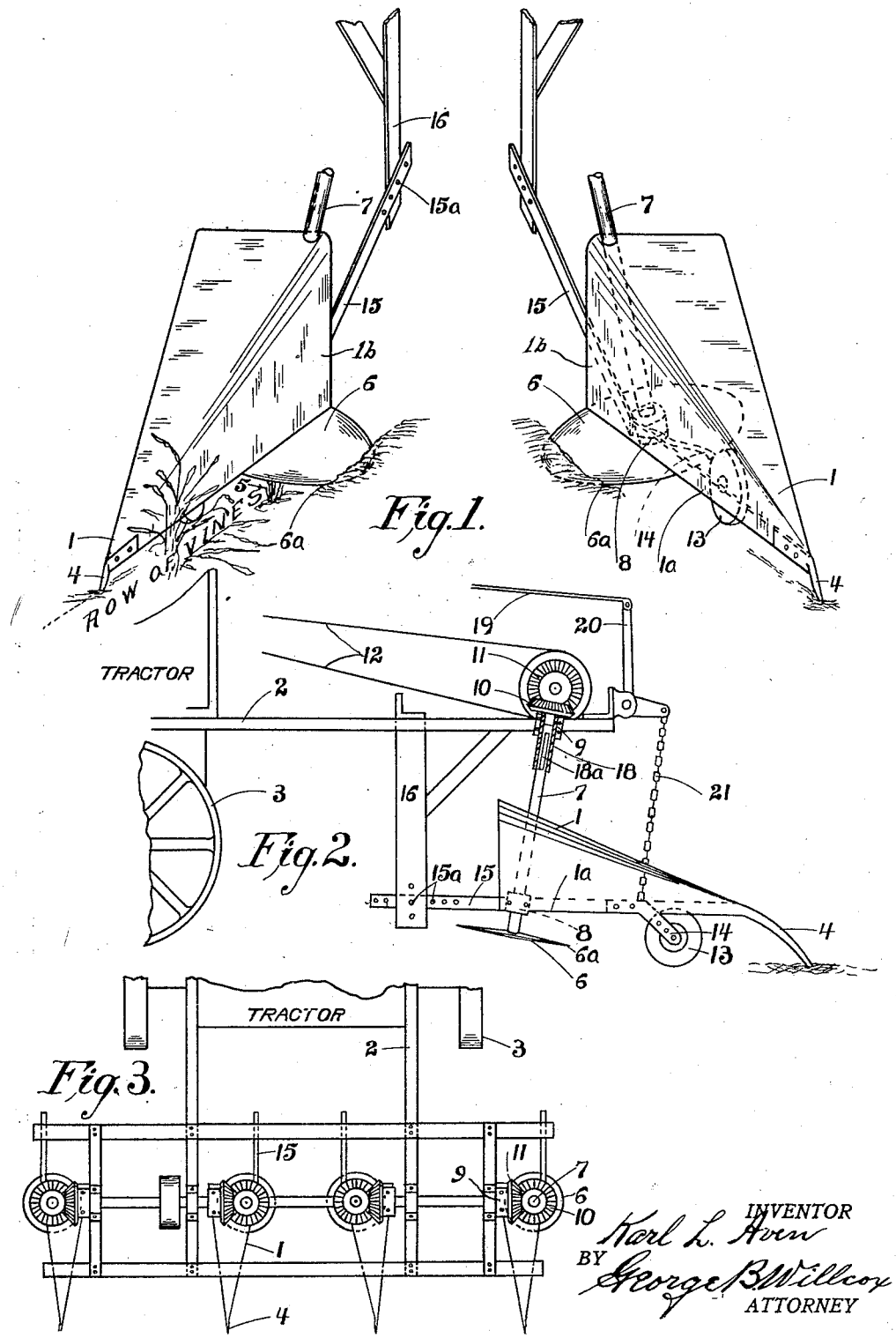

1,727,802

UNITED STATES PATENT OFFICE.

KARL L. AVEN, OF BLUMFIELD TOWNSHIP, SAGINAW COUNTY, MICHIGAN, ASSIGNOR OF ONE-THIRD TO JOHN HARTMANN, OF BLUMFIELD TOWNSHIP, MICHIGAN.

BEAN HARVESTER.

Application filed November 28, 1927. Serial No. 236,092.

This invention relates to machines for harvesting the ripened and sun-dried vines of peas, beans and the like and pertains more particularly to means for cutting and windrowing the vines as they lie in the field, without unduly agitating them, so as to avoid shaking the peas or beans from their dried and brittle pods.

My invention relates more especially to an improved device for lifting the vines and dried pods off the ground along one side of the row without unduly agitating them and, while a side of the vine is so lifted, severing the exposed stalks close to the ground and finally depositing the severed vines with their pods intact in windrows on the ground, or on any suitable conveyor for discharge into a threshing machine. The threshing machine may be built integral with my vine harvesting device, or the harvester may be used without a threshing machine.

Since the present claimed invention relates only to the harvesting feature of the operation it will be illustrated and described without further reference to a threshing mechanism.

The objects of my improvement are to provide a novel vine lifting device, co-operating with which is a novel vine cutting device. The object of the lifting device is to lift the pods, leaves and stems along one side of the row of vines clear of the ground, notwithstanding part of them may lie flat upon the ground or even partly imbedded in dirt. The object of the cutting device is to sever the stalks when one side of the vine is lifted, as above described, cutting the stalks close to the ground surface, yet avoiding cutting into those pods or stems that lie directly in line with the vine row or along the opposite side of the row and which are not raised off the ground by the action of the vine lifting device.

Another object is to mount the vine lifting device and the cutting device so that both together can be adjusted in height relatively to the ground, and so that the angle of tilt of the cutting disk can be adjusted as desired with relation to the ground.

With the foregoing and certain other objects in view, which will appear later in the specifications, my invention comprises the devices described and claimed and the equivalents thereof.

In the drawings Fig. 1 is a front view of the vine lifter and cutter.

Fig. 2 is a side view, partly diagrammatic of the device applied to the front end of a tractor.

Fig. 3 is a top plan view of the parts shown in Fig. 2.

As is clearly shown in the drawings, the vine lifting device of my invention consists in an upwardly and rearwardly extending deflecting apron 1, preferably formed of a piece of sheet metal. It is carried on a frame 2 which is mounted on wheels 3 and can be traversed along the row of vines by tractor or other power. The bottom edges $1^a$ of the deflecting apron 1 travel clear of the ground by a small amount, say, approximately two inches. At the forward advancing end of the apron is a forwardly and downwardly projecting finger 4 whose tip penetrates the ground a short distance so as to surely pass underneath those vines and pods that are lying flat on the surface of the ground and to gently lift and guide them onto the upwardly and rearwardly extending smooth surface of the apron.

The advancing end of the apron moves along one side of the row of vines and as it advances it slides under and lifts that side of the row, which the finger has already started to lift, thereby exposing one side 5 of the stalks where they project from the ground. The side wall $1^b$ of the apron keeps the raised vines and pods upright.

The cutting device of the invention as claimed comprises a disk 6 that revolves while in operation. The disk is carried by an upwardly extending spindle 7 mounted in suitable bearings 8, 9 and fitted with a gear 10 which is driven by a pinion 11 which may be rotated by suitable driving gears from the wheels 3, or if the harvester is propelled by a tractor the pinion 11 may derive its motion by belt 12 from the tractor mechanism, not shown.

The cutting disk 6 is located beneath the bottom edge 1ᵃ of the vine lifting apron 1, and is partly concealed by it, at the rear of the finger 4. The disk is flat and is preferably slightly tilted sidewise to slope downwardly away from the upright wall of the apron, as indicated in Fig. 1, and likewise is tilted to slope from its center downward toward its front or advancing edge 6ᵃ, as shown in Fig. 2. The amount of the sidewise tilt combined with the forward tilt is such that the part of the revolving cutter edge which is lowest cuts slightly into the ground at the side of the vine row opposite the finger 4, just beyond the stalks. That part of the revolving cutting edge which is directly on the line of the row is thereby enabled to sever the upright stalks at a point close to and just above the surface of the ground. The object of running the lower lateral edge 6ᵃ of the disk into the ground is to insure that any pods or stems lying directly on the ground, whether in the center line of the row or on the side of the row opposite the lifting finger 4 will not be cut by the revolving disk.

To properly gauge the height of the disk 6 above the surface of the ground I provide a guide-wheel 13 adjustably mounted on a bracket 14 secured to a bar 15 that carries spindle bearing 8, whereby the disk 6 and apron 1 must follow the up-and-down movement of the wheel 13 as it travels over the ground.

To vary the fore-and-aft tilt of the disk and consequently the amount it dips into the ground I regulate the angularity of the disk spindle 7 by frame adjustments which will now be described.

The journal box 8 of the spindle is mounted on a substantially horizontal bar 15, the forward end of which forms the vine lifting finger 4, the back end of the bar having holes 15ᵃ for adjustable pin connection to the lower end of a downwardly extending brace 16 fixed at its upper end to the harvester frame 2. By shifting the pin adjustment and setting the bar 15 backward or forward the amount of fore-and-aft tilt of the spindle 7 and disk 6 can be decreased or increased.

The bearing boxes 9 of the gear 10 and pinion 11 are capable of slight movement to accommodate the angular adjustment of the spindle 7. Its longitudinal movement is provided for by a telescoping sleeve 18 and a feather 18ᵃ, indicated in Fig. 2. The forward part of bar 15 can be raised and lowered by the operator to lift the finger 4 and the disk 6 clear of the ground. For that purpose a rod 19 is extended from the operator's station to the upper end of a bell crank lever 20, the other end of which is connected to the bar 15 by a chain 21.

Having thus described my invention, what I claim and desire to secure by Letters Patent is:

1. In a harvester for beans and the like a vine lifter comprising a forwardly and downwardly projecting finger adapted to project into the soil and an apron comprising a side wall and an upwardly inclined top, said apron extending upwardly and rearwardly from said finger, a stalk-cutter comprising a revolvable disk located beneath the apron at the back part and projecting laterally beyond the lower edge of the side wall thereof and tilted to incline downwardly at its forward edge and also sidewise, a bar carrying said finger, apron and disk, said bar adapted to be adjustably positioned for varying the tilt of said disk.

2. In a harvester for beans and the like a vine lifter comprising a forwardly and downwardly projecting finger adapted to project into the soil and an apron extending upwardly and rearwardly from said finger, a stalk-cutter comprising a revolvable disk located beneath the apron at the rear part thereof and projecting laterally beyond the lower edge thereof and tilted to incline downwardly at its forward edge, and laterally to enter the ground at its side edge, said disk adapted to be adjustably positioned for varying the tilt thereof.

3. In a harvester for beans and the like a vine lifter comprising a forwardly and downwardly projecting finger adapted to project into the soil and an apron having a face extending upwardly and rearwardly from said finger, and a side wall, a stalk-cutter comprising a revolvable disk located beneath the apron, an edge of said disk projecting laterally beyond the edge of said side wall, said disk tilted to incline downwardly at its forward edge.

4. In a harvester for beans and the like a vine lifter comprising a forwardly and downwardly projecting finger adapted to project into the soil and an apron extending upwardly and rearwardly from said finger, a stalk-cutter comprising a revolvable disk located beneath the apron and projecting laterally beyond the edge thereof and tilted to incline downwardly at its forward edge and laterally to enter its side edge into the soil, for the purposes set forth.

In testimony whereof, I affix my signature.

KARL L. AVEN.